Dec. 27, 1927.
H. ANDRESEN
1,654,156
INTERNAL COMBUSTION ENGINE
Filed Nov. 16, 1922
4 Sheets-Sheet 1
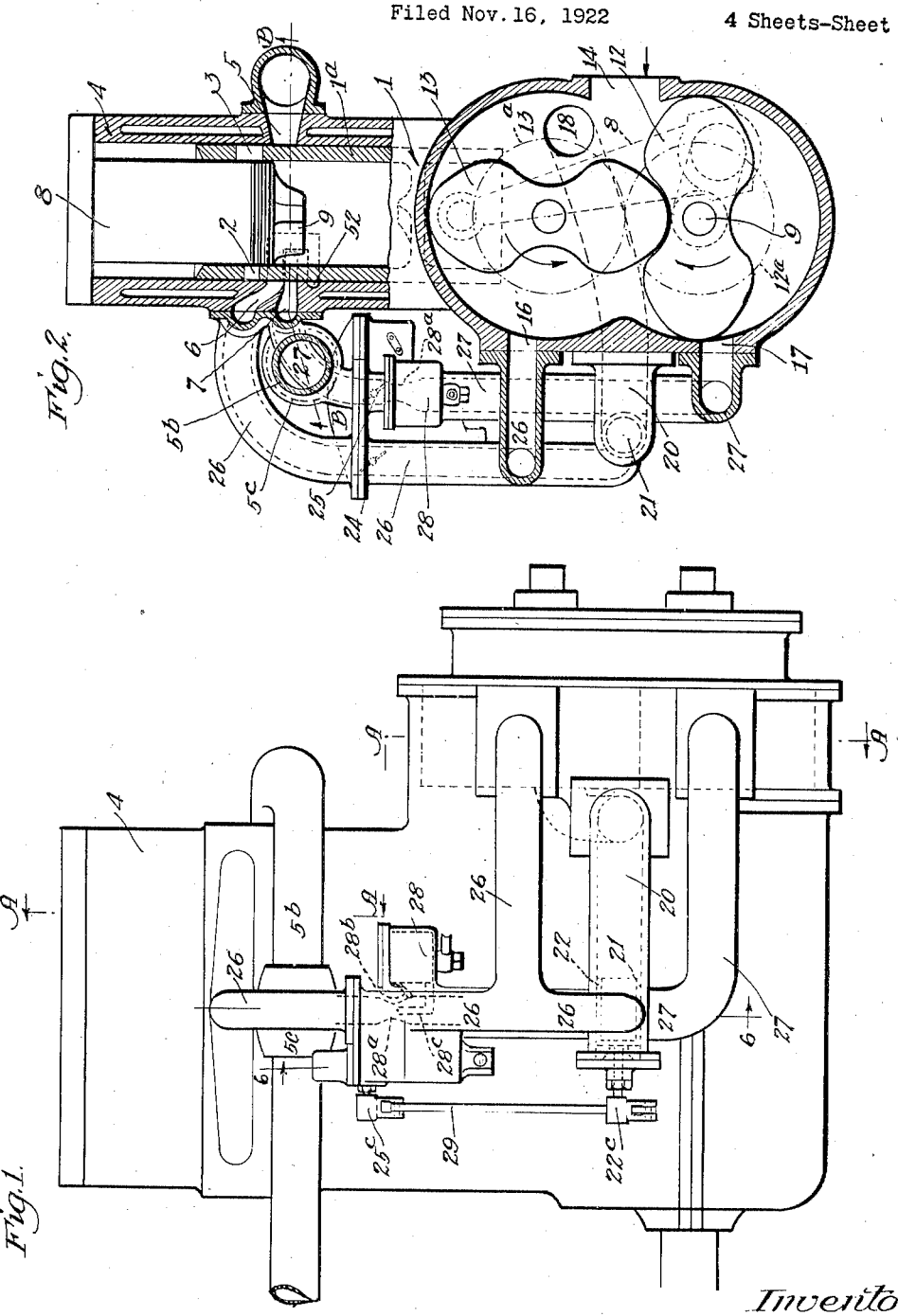
Inventor:
Halvor Andresen

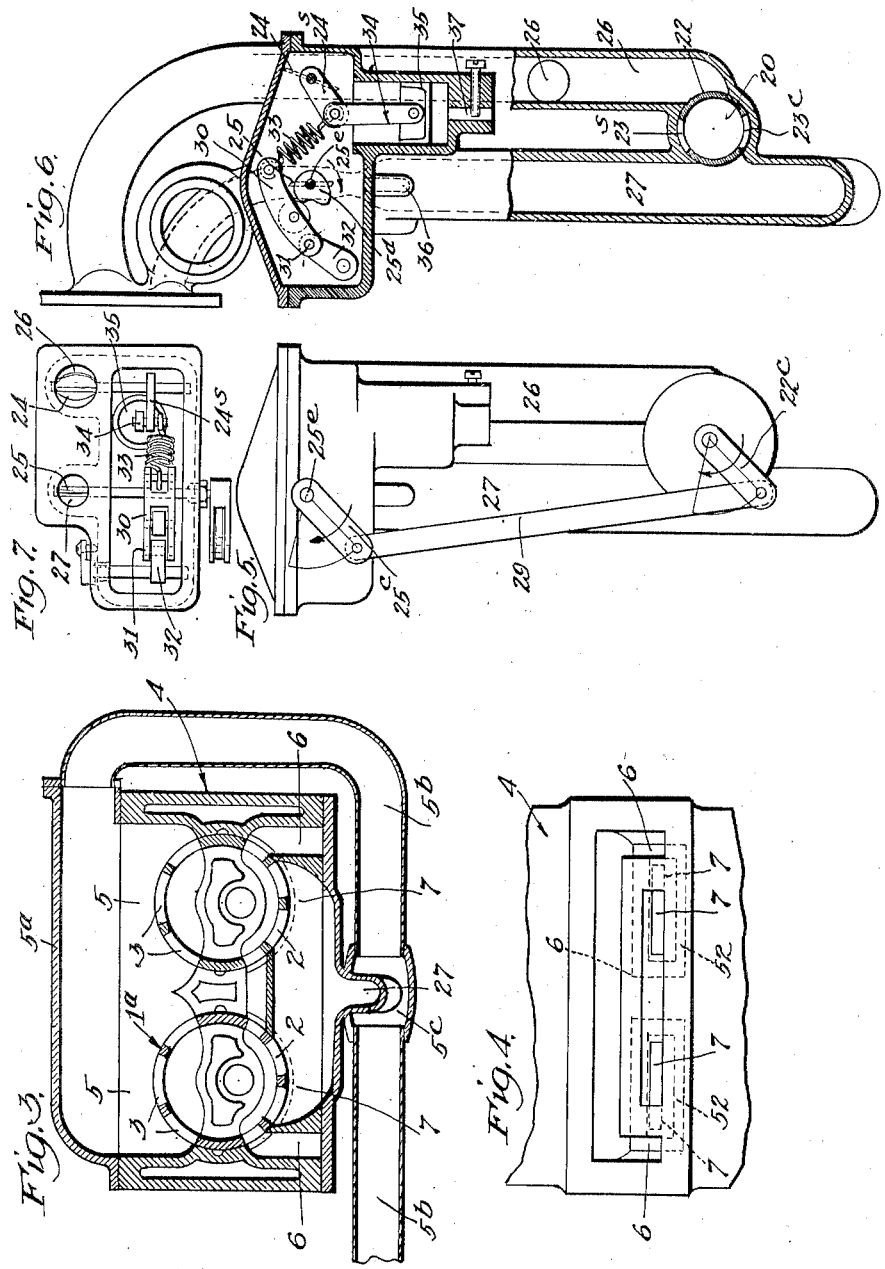

Dec. 27, 1927.  1,654,156
H. ANDRESEN
INTERNAL COMBUSTION ENGINE
Filed Nov. 16, 1922  4 Sheets-Sheet 3
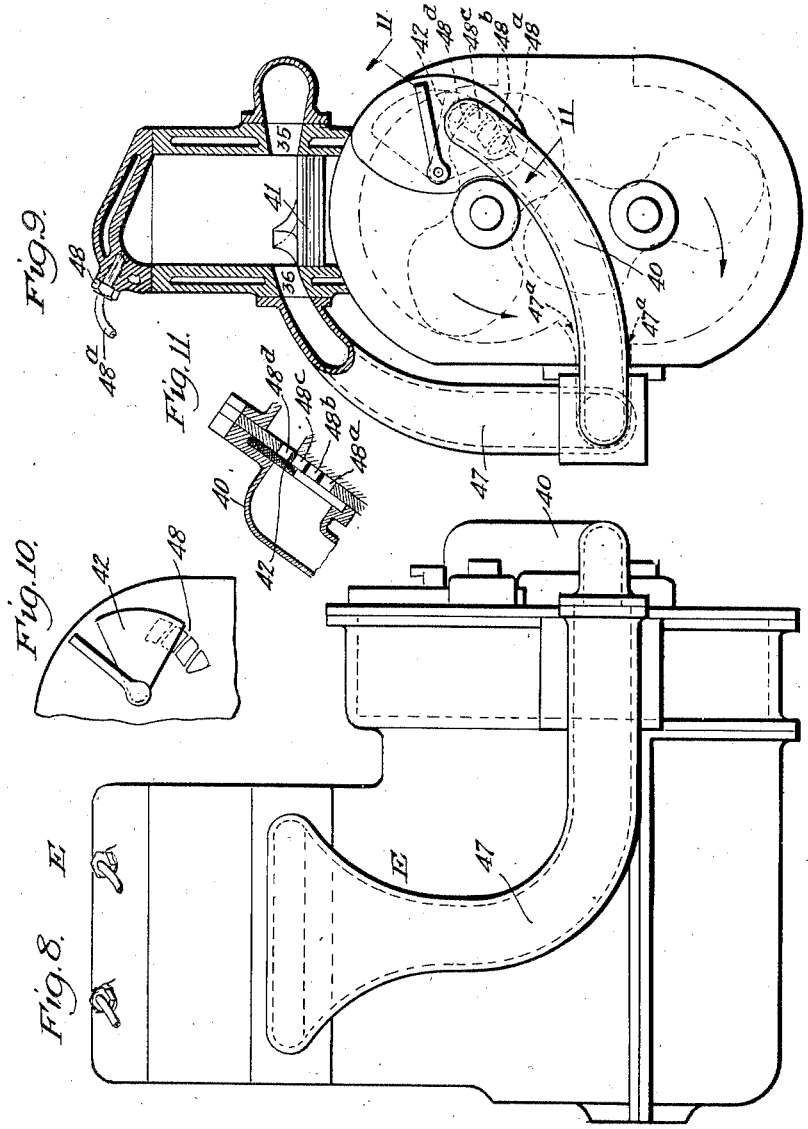
Inventor:
Halvor Andresen.
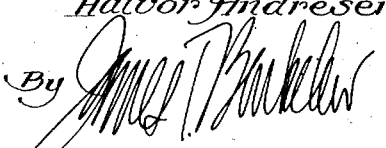
his Attorneys Dec. 27, 1927.  1,654,156
H. ANDRESEN
INTERNAL COMBUSTION ENGINE
Filed Nov. 16, 1922  4 Sheets-Sheet 4
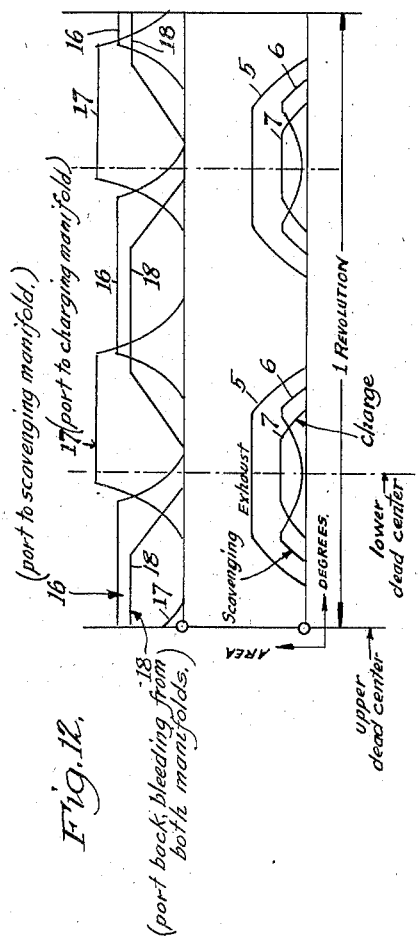
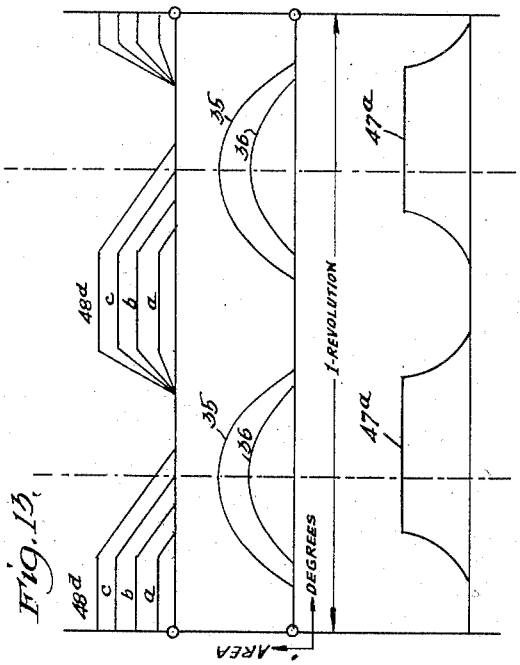
Inventor:
Halvor Andresen
By [signature]
his Attorney Patented Dec. 27, 1927.

1,654,156

UNITED STATES PATENT OFFICE.

HALVOR ANDRESEN, OF NEW YORK, N. Y., ASSIGNOR, BY MESNE ASSIGNMENTS, TO SAID HALVOR ANDRESEN, OF CHRISTIANIA, NORWAY, AND OLIVER OTIS HOWARD, OF ROCKPORT, MASSACHUSETTS.

INTERNAL-COMBUSTION ENGINE.

Application filed November 16, 1922. Serial No. 601,403.

My invention relates to internal combustion engines of the type to which the gases for combustion, whether pure air or combustible charge, are supplied or delivered to the combustion space by forces generated outside of this combustion space of the cylinder.

It is generally understood that in engines of this type where the burnt gases remaining in the cylinder are forced out through the exhaust port and replaced by gases for the next following combustion, an intermingling of the burnt gases and the entering gases will take place, and that some of the entering gases may escape through the exhaust port before this is closed and compression begins, and therefore are lost for the production of power; and that in order to have a cylinder entirely filled with fresh combustible gases at the time the compression begins it is generally necessary to introduce a greater amount of gases than the cylinder capacity at the position of the piston where compression begins. If the combustible charge is formed outside of the cylinder the intermingling and escape through the exhaust port means low efficiency of the engine, and to avoid this it has been found advantageous to introduce an amount of scavenging air before the charge enters the cylinder.

If such an engine is operated at partial load it is evident that less combustible gases should be contained in the cylinder at the time compression begins, and that the total and relative amounts of scavenging air and charge should not be the same as at full load of the engine. Also in order to obtain efficient combustion the reduced charge should be separated from the remaining burnt gases in the cylinder, and that this charge should be concentrated around the point of ignition in the combustion space.

The object of my invention is to establish such conditions of flow to the cylinder which are essential for efficient operation of the engine at different loads and speeds. The drawings and specifications will show how the movements of the air-delivery mechanism, the volume and control of the passages manifolds leading to the cylinder, and the cylinder ports all function together and perform a sequence of operations for the purpose of obtaining the desired conditions of delivery to the combustion cylinder.

While the drawings and specifications only show a few applications of my invention, it is not intended to limit the scope of my invention to the specific design type of engines described.

Fig. 1 is a side elevation of an engine embodying my invention.

Fig. 2 is a vertical section on line A—A, as indicated in Fig. 1.

Fig. 3 is a cross section on line B—B through the ported section of the cylinder, as indicated in Fig. 2.

Fig. 4 is a side elevation of the intake passages in the cylinder-block as seen with the manifolds removed.

Fig. 5 is an enlarged elevation of the control mechanism, as seen from the left of Fig. 1.

Fig. 6 is an enlarged section on line 6—6 of Fig. 1.

Fig. 7 is a top view of the control mechanism, as seen with the cover removed.

Fig. 8 is a side view of another engine embodying my invention.

Fig. 9 is an end view and vertical section of the same engine.

Fig. 10 shows details of the air control mechanism of the same engine.

Fig. 11 being a section on line 11—11 of Fig. 9.

Fig. 12 is a diagram showing the valvular action of the first form of engine, and Fig. 13 is a similar diagram for the second form.

Referring to the drawings, and first to Fig. 2, I have shown an engine having a piston 1 embodying a sleeve extension 1ª with slotted ports 2 and 3. The piston reciprocates in a cylinder 4 having ported openings 5, 6 and 7 which at certain positions of the piston register with the ports 2 and 3 in the sleeve extension. The piston is connected by a rod 8 to a crank shaft 9 in the usual manner.

The crank-shaft drives in timed relation the air-delivering mechanism, shown as a positive blower, mounted on the one end of the engine crankcase. The one lobe 12, of the blower, is mounted direct on crankshaft 9, or coupled thereto, the other lobe 13 being driven by gears 12ª, 13ª, as usual for the type of blower shown. The blower has an intake opening 14, and outlet openings, or ports 16 and 17.

The manifold 26 connects the port 16 of the blower with the upper, or scavenging, port 6 in the cylinder block; and the manifold 27 connects port 17 with the lower or charging port 7, of the cylinder. This manifold 27 carries the carbureter of any suitable kind; for instance, a fuel chamber 28 with a fuel delivery pipe 28ᶜ extending into venturi 28ª in the manifold 27, which venturi is located below charge controlling throttle 25.

The float chamber 28 of the carbureter is connected by passage 28ᵇ above the fuel level to the charge manifold 27 on the upstream side of the venturi 28ª, thus causing a discharge of fuel by the difference in static pressure, in the usual manner.

The butterflies 24 and 25 control the relative amounts of flow through the two passages, and also in so far as a difference in pressure at the blower, or other leakage areas, corresponds to a different amount of air being delivered to the engine per revolution of the blower, the butterflies control to a certain extent the total amount of air being delivered to the cylinder. The main control of the amounts of air delivered is by means of a backbleed passage, 20, see Fig. 6, which when the rotary valve 22 is turned connects with the manifolds 26 and 27 through the slots 23ª and 23ᶜ, respectively. The passage 20 connects through an opening 18 to the intake side of the blower, and it will be seen that the lobe 13 in certain positions covers this opening 18, thus during a certain period of the sequence checking the backbleeding of air to the intake side. Valve 22 is connected to the charge manifold butterfly 25 by arm 22ᶜ and connecting link 29, so that when the butterfly stands in its full open position, as indicated in Fig. 6, the valve 20 stands in its position where it preferably cuts off the two manifolds 26 and 27 from the back bleed passage 20, 18. As the charge manifold butterfly is turned in the direction indicated by the arrow in Fig. 6 to close it down, valve 20 turns in the direction indicated in Fig. 5 to connect the two manifolds 26 and 27 to the back bleed passage, preferably connecting the charge manifold 27 with the back bleed slightly in advance of the connection of the scavenging manifold 26 to the back-bleed.

In order to explain the sequence of port opening and closing I refer to Fig. 12 in which the curves marked with corresponding numbers represent the port-areas over degree of crankshaft rotation. The curves 16ª and 17ª represent the effective port areas which connect the respective manifolds to the blower-space in which at the time compression of air is taking place. The actual openings 16ª and 17ª always connect the manifolds to the blower, but in the positions where the curves indicate "zero" the connection is to the neutral blower space where no compression can take place (for instance as shown for port 17 in Fig. 1); consequently as the air in this space is at about intake pressure no delivery from this space to the manifold can take place; on the contrary there will be a blowback from the manifold to the blower if the manifold pressure at the time is higher than the intake pressure, which generally is the case, resulting in a pressure reduction in the manifold. It will be seen how this pressure reduction is taken advantage of in the general sequence of air delivery.

Looking at Fig. 2 and Fig. 12 the operation of the engine will be readily understood. The piston is forced down by the explosion and expansion of the combustible gases. Near the lower dead center the exhaust ports are first uncovered and the flow of the burnt gases from the cylinder begins. Then the scavenging port 6 is uncovered by the port 2 in the sleeve, and the inrushing scavenging air will begin to force the remaining burnt gases out through the exhaust port; then as the port 2 moves downward it passes the edge which separates the ports 6 and 7 in the cylinder-block, and air mixed with fuel charge will enter through port 7. According to the position of the edge and the width of the port in the sleeve, the flow through the scavenging port 6 may again be restricted (as shown in the diagram) as the piston moves further down. The ports close again in the reverse sequence when the piston again moves upwards.

Speaking first of the operation of the engine under full load (with back-bleed valve 20 closed), the relative air and charge distributions and distribution of air from the compressor will first be described. Starting with the position immediately after the cylinder ports have closed (the engine piston is on its upward compression stroke), it will be noted that both ports 16 and 17 are open and, therefore, that the blower is then compressing into both scavenging and charging manifolds 26 and 27. Shortly thereafter the blower port 17 to the charging manifold is shut off while blower port 16 to the scavenging manifold remains open. A slight pressure drop will occur in the charging manifold at about the position of closure of port 17 due to the fact that this closure is effected by disconnecting port 17 from the pressure space of the blower and connecting it to the neutral or non-compression space of the blower. This position is that which is shown approximately in Fig. 2 of the drawings. From the time the charging manifold port is thus cut off from the blower until the time the charging manifold port again opens (as will be hereinafter noted) the scavenging manifold receives all the compressed air from the blower and the pressure in that manifold rises at a more rapid rate than when both manifolds are receiving compression. The pressure in the scavenging manifold rises rapidly until about the time of opening of the cylinder scavenging port 6, at which point the scavenging air is released to the engine cylinder. The pressure in the charge manifold will remain as it was until port 7 or port 17 opens (in this particular case these two ports open simultaneously, but such absolute simultaneity is not necessary).

Immediately upon the opening of the cylinder scavenging port 6, the built up pressure in the scavenging manifold, of course, drops; the drop depending upon the blower delivery, the manifold volume, area of the ports and also the cylinder back pressure. At about the time the two ports 7 and 17 open, the pressure in the scavenging manifold has fallen to about that in the charge manifold; and immediately upon opening of port 17 from the blower to the charge manifold and opening of cylinder charge port 7, these pressures will become equal because at that time the blower is compressing into both manifolds (both ports 16 and 17 are open) and both manifolds are then, for the time being, discharging into the cylinder through the open ports 6 and 7. Thereafter the pressures in both manifolds will continue more slowly to drop at about the same rate until the scavenging manifold is cut off from the blower by closure of port 16. At the same time, while port 16 is closing, port 6 has been closing down as the engine piston reaches its lower dead center; and although thereafter port 6 is again opened up, the port 16 remains closed during this latter half of the opening of port 6, so that scavenging air does not flow into the cylinder after closure of port 16, and does not flow into the cylinder during the latter part of charge flow through cylinder port 7. During all the time that cylinder charge port 7 is open, the charge manifold 27 is connected with the blower. Consequently, even though port 7 is open, the pressure in the charge manifold 27 during the latter part of the time port 7 is open and after scavenging blower port 16 has been closed, may remain substantially stationary or, under certain conditions may even begin to rise, with the result of putting into the cylinder at a late time a larger proportion of charge than would otherwise be the case.

A little after charge port 7 closes, blower port 16 to the scavenging manifold again opens and thereafter blower port 17 to the charging manifold closes prior to the subsequent cyclic opening of the cylinder scavenging port 6, so that again at the time of scavenging port opening the blower is compressing solely into the scavenging manifold as has been noted above.

One of the results obtained from the foregoing described sequence of operations is the relative retardation of delivery of charge to the cylinder, as well as delivery of that charge under a comparatively low pressure that will not tend to blow the charge through the cylinder along with the exhaust gases and scavenging air that are still flowing out through the exhaust port. It will be noted, of course, that the exhaust port does not close until after the cylinder charge port 7 closes, as it opens before the scavenging port and the charge port open. It is, of course, desirable to supply the scavenging air in such quantity and at such pressure as to blow the cylinder completely clean of exhaust gases; and this, of course, results in a quantity of scavenging air being blown out through the exhaust port along with the exhaust gases in order to insure a clean cylinder. Although such a flow through and out of the cylinder is thus desirable on the part of the scavenging air, it is, of course, most highly desirable not to blow any of the charge out through the exhaust port.

The blower being of fixed capacity, has a certain amount of air to deliver to the cylinders; and a certain proportion (this proportion varying slightly at different speeds or loads of operation) of the total amount of air that is put into the cylinder must pass through the carburetor in order to introduce sufficient fuel to form a combustible mixture with the air that passes through the carburetor and with the scavenging air remaining in the cylinder. If, then, as is the case here, in a later period of the cylinder charge port opening, relatively more air is delivered through the carburetor than through the scavenging manifold, it results that less air will have to pass through the carburetor during the earlier period of cylinder charge port opening. This is the primary object of shutting off blower delivery to the scavenging manifold 26 during the period following the closure of blower port 16, and during the latter part of the period in which cylinder charge port 7 is open. This arrangement tends very effectively to prevent admixture of the charge with the scavenging air during the early admission of the scavenging air and during the time when the major part of the exhaust gases are being blown from the cylinder, and further effectually prevents the charge from being blown out the exhaust port. Another feature of operation in the engine that effectually prevents loss of the charge is due to the pressure relation between the scavenging air and the charge. When the charge port 7 opens the pressure in the scavenging manifold has fallen towards, if not quite to, the pressure in the charge manifold. If at the time of charge port opening the pressure in the scavenging manifold is still somewhat higher than in the charge manifold, that fact is largely due to the fact that the cylinder pressure has not yet fallen low enough to allow the pressure in the scavenging manifold to fall to the pressure then existing in the charge manifold. Consequently that same cylinder pressure will stop or retard the charge flow into the cylinder until the cylinder pressure and the scavenging manifold pressure have fallen to approximate equality with the charge manifold pressure. Consequently, if the cylinder pressure is comparatively high and it requires a comparatively longer time to exhaust the burnt gases from the cylinder, the inflow of charge is correspondingly delayed until the pressures have fallen; that is, until the burnt gases have been largely cleaned out of the cylinder by the scavenging air. The subsequent and thus delayed introduction of the charge at this comparatively low pressure (low because at the beginning of charge flow into the cylinder the blower has been feeding both scavenging and charge manifolds, and because during the latter part of the charge flow, when the blower is feeding the charge manifold only, the charge port to the cylinder is open and the pressure in the cylinder is low) is very effective in minimizing turbulence within the cylinder and, further, in minimizing loss of charge through the exhaust port. The smoothly inflowing charge pushes the remaining burnt gases and some scavenging air out of the exhaust port ahead of it. Furthermore this smooth inflow of the charge under comparatively low pressure aids in the proper stratification of the charge near the cylinder head (the ports being at the cylinder head), and thus aids the ignition of a partial charge when operating at low output. The cylinder must, of course, even when operating at low output, be filled with scavenging air and charge in order to force out the burnt gases; and at low output the proportion of combustible fuel must necessarily be lower than at full output. Stratification of this partially combustible charge aids in infallibility of ignition.

Another feature having to do with the relation of scavenging and charge pressures, causing delay of charge introduction, resides in the physical formation of the scavenging and charge ports. It will be noted that the cylinder scavenging port 6 is so formed that it directs the scavenging air downwardly over the lips separating the two cylinder ports, and also that the deflector 9 on the cylinder head 8 directs the scavenging air downwardly so that when sleeve port 2 is in register with both ports 6 and 7, then if the scavenging port is at a higher pressure than the charge, the presence of that scavenging air under its higher pressure immediately at and in the port 2, prevents or retards the delivery of charge through that port to the cylinder.

What has been said so far has disregarded the action of the back-bleed valve 20, that valve being considered as closed or substantially closed, as it is when the engine is operating under full output. At lower outputs when charge throttle 25 is closed down, valve 20 is rotated to connect first the charge manifold and then both charge and scavenging manifolds to bleed-back 20, 18. This bleed-back, as before noted, goes to the intake side of the blower and is closed during certain periods by the blower lobe 13. At lower outputs the operation of the engine is thus affected by the operation of this bleed-back. By reference to the diagram of Fig. 12 it will be seen that the bleed-back port 18 is opened in this present arrangement at a time shortly after the piston reaches its lower dead center position, and is closed shortly before the piston again reaches that position. The time during which the bleed back is closed is a period substantially wholly during the period when the blower is delivering to both charge and scavenging manifolds, the bleed-back closing after the port to the charge manifold opens, and opening again at about the time the port 16 to the scavenging manifold closes. Consequently the general action of the back-bleed port is to generally reduce the pressures in both manifolds when operating at lower output; but the closure of the back-bleed during the period described has the effect of relatively keeping up the manifold pressures at a time when both manifolds are being fed from the blower and both cylinder ports are open. Consequently, although the manifold pressures are generally lessened by this back-bleed operation, so that at low output less air and less charge are put through and into the cylinder, yet during the actual period in which air and charge flow into the cylinder, and particularly during the period of charge flow into the cylinder, the manifold pressure is kept up so as to still maintain an even, steady charge flow into the cylinder; thus keeping, even at low output operation, the advantages that have been hereinbefore described, and particularly the advantage of late or retarded flow of charge into the cylinder.

The same sequence of actions as have been described will take place for the second cylinder; the design and the diagrams being drawn for a two cylinder engine. The blower goes through two complete cycles for each revolution, and is thus adapted to a two cylinder engine, but it is readily seen how approximately the same conditions may be obtained in engines having a different number of cylinders or a different general layout.

It will be evident from this explanation of the sequence how the object is obtained: A high pressure is generated at the scavenging port, thus giving a sudden rush of scavenging air which forces the remaining gases in the cylinder towards and out through the exhaust port, while the pressure of the air mixed with fuel at the charging port is relatively lower (at least at the first opening of charging port 7), which means slower entry into the cylinder, a condition which tends to prevent intermingling and blowing through of fuel; and the main portion of the charge enters later and after blower connection to the scavenging manifold has been cut off, which also is of advantage for preventing blowing-through. The air-fuel mixture and the scavenging air still flowing from the scavenging port is mixed along the edge and in the cylinder, thus forming the final combustible charge. Therefore the relative amounts of flow through the two passages (manifolds) 26 and 27 determine the composition of the combustible charge in the cylinder. It will be readily understood that there are three main factors determining this relative amounts of flow: the timing and area of the blower ports 16 and 17, the volumes and areas of the respective manifolds leading from the blower to the cylinders, and the timing and area of the cylinder ports themselves. Superposed on these conditions is the action of the back bleed. As there, however, also are other conditions which affect the relative flow, such as the leakage characteristic of the blower itself and other leakage areas, and the difference of back pressure in the cylinder at different speeds and loads, and also for reasons of performance of the engine, a difference in the relative flow, i. e. in the composition of the combustible charge may be desirable. I have in the two butterflies 24 and 25 shown means for controlling the relative flow. These butterflies also, in so far as their opening and closing will vary the pressure at the blower, affect the total delivery of air and charge to the engine, according to the leakage characteristic of all the openings exposed to the pressure.

When the power required of the engine is less than that corresponding to the maximum delivery of the blower, it is evident that less air and fuel should be delivered to the engine, and that the conditions of flow to the engine, for most efficient power output, are not the same as for maximum flow.

Looking at Figs. 5, 6 and 7 the operation of the control mechanism is easily understood. The rotary valve 22 is turned by a lever 22ᶜ connected by a rod 29 to the lever 25ᶜ which operates the charge controlling butterfly 25. This butterfly shaft 25ᵉ carries a cam 25ᵈ against which rests a roller carried by the lever 30 which pivots around a pin 31, this pin being carried by a lever 32. The lever 32 generally is in a fixed position, but may be moved for adjustment of the spring tension 33, exerted on the other end of the lever 30. If this lever 32 is moved to increase the tension of the spring 33 a resultant richer mixture will be delivered to the cylinder, and vice versa. The spring 33 is suspended in a state of tension between the end of the lever 30 and the lever 24ᵃ which operates the scavenge controlling butterfly 24. The lever 24ᵃ is also, by rod 34, connected to a piston 35. The mechanism is enclosed and kept under the pressure existing in the charging manifold 27 by a passage 36. The inner or upper side of the piston 35 is under the charging manifold pressure while the outer side is under atmospheric pressure through a passage 37.

The position of the mechanism as shown in Figs. 5 and 6 is for full power output of the engine, and at a speed where the charging manifold pressure is not high enough to deflect the spring 33 sufficient to open the scavenging butterfly wide. If the speed of the engine increases the charging manifold pressure will increase, and the increased force exerted on the piston 35 will move the piston down and deflect the spring 33 more and consequently the butterfly 24 will be opened more.

If then the lever 22ᶜ and 25ᶜ are moved in the direction indicated by the arrow in Fig. 5 the backbleed will be connected to the manifolds and at the same time the charge control butterfly 25 moves in the direction of closing. The cam 25ᵈ moves with this butterfly and according to the shape of the cam the spring tension will vary and so cause the two butterfly valves to take different relative positions. This will be readily understood when it is remembered that butterfly 24 is held in position by the two opposing forces (1) tension of spring 33 (2) manifold pressure on piston 35. For instance, an increase of spring pressure or decrease of charging manifold pressure causes butterfly 24 to close. In this particular instance a cam 25ᵈ is shown that will, on closing motion of butterfly 25, first relieve somewhat the tension of spring 33 and then, on further closing motion, increase the spring tension. Generally speaking the cam contour is designed, in any particular case, to vary the spring tension in such manner as to change the relations between the two butterflies as to keep the cylinder mixture at the proper proportions throughout changes of engine speed and output. It is also seen that the overlapping port edges of the valve 22 can make a difference in the areas connecting the respective manifolds to the backbleed. And it is readily understood how the cooperation of these different elements controlling the flow through the scavenging and charging ports of the cylinder have a certain characteristic consistent with requirements of the total and relative amounts of flow for different speeds and loads of the engine. Therefore for engines having different general layout, length and volume of manifolds and other characteristics influencing the flow and pressure variations in the manifold during the flow, these controlling elements may be varied to suit the varying conditions and general purpose for which the engine is intended.

Neither are the positions of the ports connecting the manifolds with the blower, and the position of the backbleed limited to the ones shown. These ports can be placed differently according to the requirements of timing and convenience in the design of the engine, as long as the moving parts of the air-delivery mechanism constitute the timing element for these port openings and closings.

From Figs. 2, 3 and 4 it will be seen how the inner end of the charging port 7 is entirely enveloped by space which is filled with air under the pressure in the scavenging manifold. The scavenging port 6 is above and at the sides of charging port 6 and a groove 52, which connects to these scavenging port openings, extends under the charging port. This arrangement is for the purpose of preventing leakage of charge along the walls of the piston.

For the purpose of better vaporization the exhaust pipe 5ᵇ is shown to be carried around from manifold 5ᵃ to a stove 5ᶜ enveloping the charging manifold.

In Fig. 8 I have shown a side view of another type of engine embodying my invention; Fig. 9 is a front view of this engine, showing a cross section as through line E—E on Fig. 8. This engine is indicated to be of the fuel injection type, the fuel for combustion being injected into the cylinder by an outside pump (not shown) through a tubing 48ᵃ leading from this pump to a nozzle 48, and sprayed into the cylinder when the piston 41 is at or near its top dead center. The piston reciprocates in a cylinder in the usual manner, by means of a connecting rod and crankshaft to which the blower is directly connected as in the before described form.

It is evident that in such an engine there can be no blowing through of fuel prior to exhaust port closing, and that the requirements to the air-delivering mechanism are simpler than in the engine previously described.

The air delivery mechanism is shown as a blower of the same type as described before. The lobes and the outlines of the circumference of the casing are shown in dotted lines. Only one port 47ᵃ and manifold 47 from the blower is provided. This port is placed so however that the blow-back through 47ᵃ which will occur to blower from the manifold when this port connects the manifold to the neutral blower space, will take place just before and after the cylinder intake port is open.

A backbleed 40 leads to a series of openings 48ᵃ, 48ᵇ, 48ᶜ, 48ᵈ which when the engine operates at full power are covered by a valve 42. Fig. 10 shows the upper right-hand corner of the blower front cover plate, the backbleed pipe 40 removed, with the valve 42 in one position over the openings. Looking at this drawing with the movement of the lobes in mind it will be seen that as the backbleed control valve 42 uncovers the successive openings 48, a, b, c, d not only the total area effective for backbleeding varies but the number of degrees of rotation during which the lobe partially and totally closes the opening also varies. So that as the valve 42 opens more and more the period during which the lobe entirely closes the backbleed is made shorter and shorter and this entirely closed period occurs relatively later the more openings are uncovered, thus giving the heaviest delivery later. which is of advantage for efficient air delivery to the cylinder at partial loads.

Fig. 13 shows a diagram of the port functions and how the time and area of the backbleed vary when the openings 48 are uncovered successively, and their timing relations to the openings of charging and exhaust ports 36 and 35.

Having described a preferred form of my invention, I claim:

1. In combination with an internal combustion engine, a gas compressor of the positive impulse type having a compression outlet, a manifold leading from the compression outlet to the engine inlet port, the engine having valvular action controlling the inlet port, and a back-bleed from the manifold to the intake side of the compressor controlled by valvular action in the compressor, the compressor and its valvular action and the engine valvular action being so relatively timed that the compressor raises its pressure impulse and communicates with the manifold at times when the inlet port is open, and the back-bleed is open at a time during the first part of the open period of the inlet port.

2. In combination with an internal combustion engine, a gas compressor of the positive impulse type having a compression outlet, a manifold leading from the compression outlet to the engine inlet port, the engine having valvular action controlling the inlet port, and a back-bleed from the manifold to the intake side of the compressor controlled by valvular action in the compressor, and adjustment means to control the back-bleed as to capacity.

3. In combination with an internal combustion engine, a gas compressor of the positive impulse type having a compression outlet, a manifold leading from the compression outlet to the engine inlet port, the engine having valvular action controlling the inlet port, and a back-bleed from the manifold to the intake side of the compressor controlled by valvular action in the compressor, and adjustment means to control the back-bleed as to the timing and period of its opening.

4. In combination with an internal combustion engine, a gas compressor of the positive impulse type having a compression outlet, a manifold leading from the compression outlet to the engine inlet port, the engine having valvular action controlling the inlet port, and a back-bleed from the manifold to the intake side of the compressor controlled by valvular action in the compressor, and adjustment means to control the back-bleed as to the timing and period of its opening and as to its capacity.

5. In combination with an internal combustion engine, a gas compressor of the positive impulse type having a compression outlet, a manifold leading from the compression outlet to the engine inlet port, the engine having valvular action controlling the inlet port, and a back-bleed from the manifold to the intake side of the compressor controlled by valvular action in the compressor; the compressor and its valvular action and the engine valvular action being so relatively timed that the compressor raises its pressure impulse and communicates with the manifold at times when the inlet port is open, and the back-bleed is open at a time during the first part of the open period of the inlet port, and adjustment means to control the back-bleed as to the timing and period of its opening and as to its capacity.

6. In combination with an internal combustion engine whose cylinder has a scavenging port and a charge inlet port, a gas compressor of the positive impulse type having two spaced delivery ports uncovered at different times by the moving members of the compressor, a scavenging and a charging manifold that connect the two delivery ports respectively to the scavenging and charge inlet ports, means to carburet the gas passing through the charging manifold; the engine having a valvular action that opens the scavenging port before the charging port, and the arrangement of the compressor delivery ports being such that the one connecting to the scavenging manifold is uncovered before the one connecting to the charging manifold; and a back-bleed from the two manifolds closed and opened by the moving parts of the compressor.

7. In combination with an internal combustion engine whose cylinder has a scavenging port and a charge inlet port, a gas compressor of the positive impulse type having two spaced delivery ports uncovered at different times by the moving members of the compressor, a scavenging and a charging manifold that connect the two delivery ports respectively to the scavenging and charge inlet ports, means to carburet the gas passing through the charging manifold; and a back-bleed from the two manifolds and valvular action in association with the mechanism to control it.

8. In combination with an internal combustion engine whose cylinder has a scavenging port and a charge inlet port, a gas compressor of the positive impulse type having two spaced delivery ports uncovered at different times by the moving members of the compressor, a scavenging and a charging manifold that connect the two delivery ports respectively to the scavenging and charge inlet ports, means to carburet the gas passing through the charging manifold; and a back-bleed from the two manifolds and valvular action in association with the mechanism to control it; and adjustment means to control the connection of the back-bleed with each manifold.

9. In combination with an internal combustion engine whose cylinder has a scavenging port and a charge inlet port, a gas compressor of the positive impulse type having two spaced delivery ports uncovered at different times by the moving members of the compressor, a scavenging and a charging manifold that connect the two delivery ports respectively to the scavenging and charge inlet ports, means to carburet the gas passing through the charging manifold; means controlled by the pressure in one manifold to control the flow of gas through the other manifold, means to control the flow of gas through the other manifold, and yielding means operated by the last mentioned control means to oppose the pressure actuation of the first mentioned control means.

10. In combination with an internal combustion engine whose cylinder has a scavenging port and a charge inlet port, a gas compressor of the positive impulse type having two spaced delivery ports uncovered at different times by the moving members of the compressor, a scavenging and a charging manifold that connect the two delivery ports respectively to the scavenging and charge inlet ports, means to carburet the gas passing through the charging manifold; the engine having a valvular action that opens the scavenging port before the charging port, and the arrangement of the compressor delivery ports being such that the one connecting to the scavenging manifold is uncovered before the one connecting to the charging manifold, and so that the first mentioned delivery port closes before the scavenging port closes and the second mentioned delivery port opens after the scavenging port opens; a back-bleed from the two manifolds closed and opened by the moving parts of the compressor so that the back-bleed is open at a time during the period when the scavenging port is open and closes as the charging port opens; means controlled by the pressure in one manifold to control the flow of gas through the other manifold, means to control the flow of gas through the other manifold, and yielding means operated by the last mentioned control means to oppose the pressure actuation of the first mentioned control means.

11. In combination with an internal combustion engine whose cylinder has a scavenging port and a charge inlet port, a gas compressor of the positive impulse type having two spaced delivery ports uncovered at different times by the moving members of the compressor, a scavenging and a charging manifold that connect the two delivery ports respectively to the scavenging and charge inlet ports, means to carburet the gas passing through the charging manifold; and a back-bleed from the two manifolds and valvular action in association with the mechanism to control it, valve means to control the flow of gases through the two manifolds; a valve to control the flow of gas through the back-bleed and means co-operating the manifold valve means and the back-bleed valve means.

12. In combination with an internal combustion engine whose cylinder has a scavenging port and a charge inlet port, a gas compressor of the positive impulse type having two spaced delivery ports uncovered at different times by the moving members of the compressor, a scavenging and a charging manifold that connect the two delivery ports respectively to the scavenging and charge inlet ports, means to carburet the gas passing through the charging manifold; the engine having a valvular action that opens the scavenging port before the charging port, and the arrangement of the compressor delivery ports being such that the one connecting to the scavenging manifold is uncovered before the one connecting to the charging manifold, and so that the first mentioned delivery port closes before the scavenging port closes and the second mentioned delivery port opens after the scavenging port opens; a back-bleed from the two manifolds closed and opened by the moving parts of the compressor so that the back-bleed is open at a time during the period when the scavenging port is open and closes as the charging port opens; means controlled by the pressure in one manifold to control the flow of gas through the other manifold, means to control the flow of gas through the other manifold, and yielding means operated by the last mentioned control means to oppose the pressure actuation of the first mentioned control means, valve means to control the flow of gas through the back-bleed; and means co-operating the manifold controls with the back-bleed control valve so that they are operated in conjunction.

13. In combination with an internal combustion engine having an inlet port, means to compress gas to the inlet port, a valve to control the flow of gas to the inlet port, a backbleed between the compressor and the inlet port controlled by valvular action associated with the mechanism, and an adjustable back-bleed control valve connected with the first mentioned valve so that as the first mentioned valve is closed the back-bleed control valve opens.

14. In combination with an internal combustion engine, a gas compressor with a compression outlet, a manifold leading from the compression outlet to the inlet port of the engine, the engine having valvular action controlling the inlet port, a back-bleed from the manifold, and valvular means operating in timed relation to the engine cycle and controlling said back-bleed.

15. In combination with an internal combustion engine, a gas compressor with a compression outlet, a manifold leading from the compression outlet to the inlet port of the engine, the engine having valvular action controlling the inlet port, a back-bleed from the manifold, a valvular means operating in timed relation to the engine cycle and controlling said back-bleed, and means for controllably varying the capacity of said back-bleed.

16. In combination with an internal combustion engine, a gas compressor with a compression outlet, a manifold leading from the compression outlet to the inlet port of the engine, the engine having valvular action controlling the inlet port, a back-bleed from the manifold, a valvular means operating in timed relation to the engine cycle and controlling said back-bleed, a valve for controlling passage of gases through the manifold to the engine inlet port, and a valve for controllably varying the capacity of the back-bleed, said last mentioned valve being operatively interconnected with said valve controlling flow of gas through the manifold.

17. In combination with an internal combustion engine, a gas compressor with a compression outlet, a manifold leading from the compression outlet to the inlet port of the engine, the engine having valvular action controlling the inlet port, a back-bleed from the manifold, a valvular means operating in timed relation to the engine cycle and controlling said back-bleed, said valvular means being so relatively timed that the compressor compresses gas into the manifold during the period when the inlet port is open, and the back-bleed is open at a time during part of the open period of the inlet port.

18. In combination with an internal combustion engine, whose cylinder has a scavenging inlet port and a charge inlet port, a gas compressor having two spaced delivery ports uncovered at different times by the moving members of the compressor, a scavenging manifold and a charging manifold that connect the two delivery ports respectively to the two cylinder ports, means to carburet the gas passing through the charging manifold, the engine having valvular action that opens the cylinder scavenging port before opening the charge inlet port, and the arrangement of the compressor ports being such that the one connecting to the scavenging manifold is uncovered before the cylinder scavenging port is open and the one connecting with the charging manifold is uncovered after said cylinder scavenge port is opened, and the one connecting with the scavenging manifold is closed before the cylinder charging port is closed.

19. In combination with an internal combustion engine whose cylinder has a scavenging port and a charge inlet port, a gas compressor, a scavenging and a charging manifold that connect the compressor with the two cylinder ports respectively, the engine having a valvular action that opens the scavenging port before the charging port is opened, and valvular means in association with the mechanism to cause connection between the compressor and the scavenging manifold at a time before the cylinder scavenging port opens and to cause connection of the compressor with the charge manifold at a time after the scavenging port has opened.

20. In combination with an internal combustion engine whose cylinder has a scavenging port and a charge inlet port, a gas compressor, a scavenging and a charging manifold that connect the compressor with the two cylinder ports respectively, the engine having a valvular action that opens the scavenging port before the charging port is opened, and valvular means in association with the mechanism to cause connection between the compressor and the scavenging manifold at a time before the cylinder scavenging port opens and to cause connection of the compressor with the charge manifold at a time after the scavenging port has opened and to cut off connection between the compressor and the scavenging manifold after the charging port has opened and before the charging port is closed.

21. In combination with an internal combustion engine whose cylinder has a scavenging port and a charge inlet port, a gas compressor, a scavenging and a charging manifold connecting the compressor with the scavenging and charge inlet ports respectively, a back-bleed from the two manifolds, and valvular action in association with the mechanism to control said back-bleed.

22. In combination with an internal combustion engine whose cylinder has a scavenging port and a charge inlet port, a gas compressor, a scavenging and a charging manifold connecting the compressor with the scavenging and charge inlet ports respectively, a back-bleed from the two manifolds, a valvular action operatively connected with the mechanism and controlling said back-bleed in timed relation to the cyclic operations of the engine.

23. In combination with an internal combustion engine whose cylinder has a scavenging port and a charge inlet port, a gas compressor, a scavenging and a charging manifold connecting the compressor with the scavenging and charge inlet ports respectively, a back-bleed from the two manifolds, a valvular action operatively connected with the mechanism and controlling said back-bleed in timed relation to the cyclic operations of the engine, and valvular means controlling communication of the two manifolds with the back-bleed, said last mentioned valvular means being operable independently of the cyclic operations of the engine.

24. In combination with an internal combustion engine whose cylinder has a scavenging port and a charge inlet port, a gas compressor, a scavenging and a charging manifold connecting the compressor with the scavenging and charge inlet ports respectively, a back-bleed from the two manifolds, a valvular means controlling said back-bleed in timed relation to the cyclic operations of the engine, the engine having valvular means controlling the scavenging and charge inlet ports to open the scavenging port before opening the charge inlet port, and the back-bleed controlling valve being timed with relation to the engine so that the back-bleed closes after the cylinder charge inlet port has opened and the back-bleed opens before the cylinder scavenging port closes.

25. In combination with an internal combustion engine having a scavenging port and a charge inlet port, a valvular mechanism that opens the scavenging port before opening the charge inlet port, a gas compressor, a valvular means to connect the gas compressor selectively with the scavenging port and the charge inlet port, said valvular means being associated in timed relation with the engine so that the compressor is connected solely with the scavenging port at a time before that port opens, and is then connected with the charge inlet port at about the time the charge inlet port opens, and is disconnected from the scavenging port before the time when the charge inlet port closes, so that during the first part of the period in which the scavenging port is open the compressor is connected solely to that port and so that during the latter part of the time when he charge inlet port is open the compressor is connected solely to that port.

26. In combination with an internal combustion engine having a scavenging port and a charge inlet port, means to supply gas and combustible charge under pressure to the scavenging and charge inlet ports respectively, a controlling valve for each of said means, an interconnective operating means between the two valves whereby one of the valves is controlled in its position by the position of the other valve and by the pressure of the gas which said last mentioned valve controls.

27. In combination with an internal combustion engine having a scavenging port and a charge inlet port, means to supply gas and combustible charge under pressure to the scavenging and charge inlet ports respectively, a controlling valve for each of said means, and interconnective operating means between the two valves for operating one valve under control of the other, said means embodying a yielding connection between the two valves and a pressure actuated element exposed to the pressure of the gas controlled by one valve and operatively connected to the other valve.

28. In combination with an internal combustion engine having a scavenging port and a charge inlet port, means including a compressor and manifolds leading to the respective ports to compress gas through the manifolds to said ports, means to supply combustible fuel to the gas passing through the charge manifold, a control valve in each manifold, yielding interconnective means between the two valves whereby the scavenging manifold valve is yieldingly operated by movement of the charge manifold valve, and a pressure actuated element subjected to the pressure in the charge manifold and operatively connected with the scavenge manifold valve.

29. In combination with an internal combustion engine having a scavenging port and a charge inlet port, a gas compressor, scavenging and charge manifolds leading to the scavenging and charge inlet ports respectively, valves in said manifolds to control the flow of gas therethrough, means operatively interconnecting said valves whereby one of said valves is operated under control of the other valve and of the gas pressure in the manifold which said last mentioned valve controls, and valvular means operating in timed relation with the engine to connect the compressor at different times with the scavenging manifold and with the charge inlet manifold.

30. In combination with an internal combustion engine having a scavenging port and a charge inlet port, a gas compressor, scavenging and charge manifolds leading to the scavenging and charge inlet ports respectively, valves in said manifolds to control the flow of gas therethrough, means operatively interconnecting said valves whereby one of said valves is operated under control of the other valve and of the gas pressure in the manifold which said last mentioned valve controls, the engine having valvular means that opens the scavenging port before opening the charge inlet port and closes said ports in reverse sequence, a valvular means operating in timed relation with the engine to connect the compressor outlet with the scavenging manifold at a time before said scavenging port opens, connect the charge manifold with the compressor at about the time the charge inlet port opens, and disconnecting the scavenging manifold from the compressor before the charge inlet port closes.

31. In combination with an internal combustion engine having a scavenging port and a charge inlet port, a gas compressor, scavenging and charge manifolds leading to the scavenging and charge inlet ports respectively, valves in said manifolds to control the flow of gas therethrough, means operatively interconnecting said valves whereby one of said valves is operated under control of the other valve and of the gas pressure in the manifold which said last mentioned valve controls, the engine having valvular means that opens the scavenging port before opening the charge inlet port and closes said ports in reverse sequence, a valvular means operating in timed relation with the engine to connect the compressor outlet with the scavenging manifold at a time before said scavenging port opens, connect the charge manifold with the compressor at about the time the charge inlet port opens, and disconnecting the scavenging manifold from the compressor before the charge inlet port closes, a back-bleed from both manifolds, and valvular means operating in timed relation with the engine for closing the back-bleed during a period in the latter part of the time that the charge inlet port is open.

32. In combination with an internal combustion engine having a scavenging port and a charge inlet port, a gas compressor, scavenging and charge manifolds leading to the scavenging and charge inlet ports respectively, valves in said manifolds to control the flow of gas therethrough, means operatively interconnecting said valves whereby one of said valves is operated under control of the other valve and of the gas pressure in the manifold which said last mentioned valve controls, the engine having valvular means that opens the scavening port before opening the charge inlet port and closes said ports in reverse sequence, a valvular means operating in timed relation with the engine to connect the compressor outlet with the scavenging manifold at a time before said scavenging port opens, connect the charge manifold with the compressor at about the time the charge inlet port opens, and disconnecting the scavenging manifold from the compressor before the charge inlet port closes, a back-bleed from both manifolds, a valvular means operating in timed relation with the engine for closing the back-bleed during a period in the latter part of the time that the charge inlet port is open, and valvular means controlling the capacity of said back-bleed, said valvular means being actuated from one of said manifold control valves.

33. In combination with an internal combustion engine having a scavenging port and a charge inlet port, and having valvular action that opens the scavenging port before opening the charge inlet port and closes said ports in reverse sequence, the scavenging and charge manifolds connecting respectively to the scavenging and charge inlet ports, a control valve in each manifold, a compressor adapted to compress gas to each manifold, means to supply fuel to the gas passing through the charge manifold, interconnective operating means between the two control valves, said means including a yielding connection between them whereby the control valve in the scavenging manifold is yieldingly operated by movement of the control valve in the charging manifold, a pressure actuated element subjected to the pressure in the charging manifold and connected to the valve in the scavenging manifold, valvular action in association with the mechanism and operating in timed relation to the engine to connect the compressor with the scavenging manifold before the scavenging port is open, to connect the compressor with the charging manifold at about the time the charge inlet port opens and after the scavenging port has opened, and to disconnect the compressor from the scavenging manifold at a time before the charge inlet port closes, a back-bleed adapted to relieve pressures from both manifolds, a valve actuated by movement of the charge manifold control valve to vary the capacity of said back-bleed, a valvular means in association with the mechanism and acting in timed relation with the engine to close said back-bleed at a time during the latter part of the period in which the charge inlet port is open.

34. In combination with an internal combustion engine having a scavenging port and a charge inlet port and having valvular action that opens the scavenging port before opening the charge inlet port, compressor means to deliver scavenging gas and gaseous charge to the scavenging and charge inlet ports respectively, valvular means in association with the mechanism and operating in timed relation with the engine to supply scavenging gas under pressure to the scavenging port at a time before that port is open, to supply gaseous charge under pressure to the charge inlet port at a time after the scavenging port has opened and to cut off supply of scavenging gas to the scavenging port at a time after the charge inlet port has opened and before that port is closed, and the scavenging port being so formed and relating to the charge inlet port that the scavenging gas delivered to the cylinder through the scavenging port flows over the charge inlet port thereby to retard flow of charge into the cylinder through the charge inlet port at times when the scavenging gas pressure is greater than the charge pressure.

In witness that I claim the foregoing I have hereunto subscribed my name this 31st day of August, 1922.

HALVOR ANDRESEN.